United States Patent [19]

Fredriksz et al.

[11] Patent Number: 5,477,423
[45] Date of Patent: Dec. 19, 1995

[54] FLAT-PANEL DISPLAY DEVICE, ILLUMINATION SYSTEM COMPRISES A SECOND PART WHICH IS A DETACHABLE COVER ALONG WHICH THE RADIATION SOURCE CAN BE REMOVED

[75] Inventors: Carel W. Fredriksz; Petrus A. J. G. Brouwer, both of Eindhoven, Netherlands

[73] Assignee: U.S. Philips Corporation, New York, N.Y.

[21] Appl. No.: 274,888

[22] Filed: Jul. 1, 1994

[30] Foreign Application Priority Data

Jul. 30, 1993 [BE] Belgium ................................ 09300813

[51] Int. Cl.[6] ........................... F21V 7/04; F21S 3/00; G02F 1/1335; G02F 1/1333
[52] U.S. Cl. ................. 362/31; 362/217; 359/49; 359/83
[58] Field of Search .................... 359/49, 50, 83, 359/48; 362/31, 317, 310, 260, 372, 26

[56] References Cited

U.S. PATENT DOCUMENTS 4,985,809  1/1991  Matsui et al. ........................... 362/31

FOREIGN PATENT DOCUMENTS

| 0266184 | 4/1988 | European Pat. Off. . |
| 0469321 | 2/1992 | European Pat. Off. . |
| 0545429A2 | 6/1993 | European Pat. Off. . |
| 04141687 | 5/1992 | Japan . |
| 2034952 | 6/1990 | United Kingdom . |

*Primary Examiner*—William L. Sikes
*Assistant Examiner*—T. Ton
*Attorney, Agent, or Firm*—John C. Fox

[57] ABSTRACT

The invention relates to a flat-panel display device (1) which is illuminated by a plate-shaped waveguide (7) which is irradiated by a radiation source (15) at one end face (25). The radiation source (15) is arranged in a reflective light-housing (13), a first part (17) of which is an integral part of a support (3) and a second part (19) is detachable so that the radiation source (15) can be replaced with recesses in the lighthousing, so that the radiation source (15) is space apart from the reflector (29) and at a distance d from the waveguide (7). FIG. 1.

18 Claims, 5 Drawing Sheets

FLAT-PANEL DISPLAY DEVICE, ILLUMINATION SYSTEM COMPRISES A SECOND PART WHICH IS A DETACHABLE COVER ALONG WHICH THE RADIATION SOURCE CAN BE REMOVED

BACKGROUND OF THE INVENTION

The invention relates to a flat-panel display device comprising an illumination system and a transmission display panel, the illumination system comprising a support, a plate-shaped waveguide and at least one lighthousing accommodating a tubular radiation source for illuminating at least one end face of the waveguide, and a reflector for reflecting radiation emitted by the radiation source towards the waveguide.

The invention also relates to an illumination system and a radiation source suitable for use in such a flat-panel display device.

An illumination system for use in a flat-panel display device of the type described in the opening paragraph is known from the English-language abstract of JP-A 4-141687. In such illumination systems the lifetime of the radiation source is many orders shorter than the lifetime of the display device in which the illumination system is used. Normally, the radiation source is therefore to be replaced several times. A drawback is, however, that the costs of replacing the radiation source are almost as high as the purchase price of a complete display device. In fact, in many cases the radiation source is fixedly connected to the illumination system or to the lighthousing so that the complete lighthousing or illumination system must be replaced. Moreover, there is a risk of damage of the display panel of the display device when the complete lighthousing is replaced and of a non-optimum position of the new lighthousing so that the brightness and homogeneity of the display device are detrimentally influenced.

The illumination system described in said abstract is designed in such a way that, in the case of maintenance of the display device it is sufficient to replace only the radiation source in a simple and relatively inexpensive manner instead of replacing the complete lighthousing or illumination system. The radiation source is situated at the location of the waveguide and at its side remote from the waveguide it is semi-circularly enclosed by, and in direct contact with, a reflector. The reflector is formed as a rotatable plate. When the radiation source is to be replaced, the reflector can be rotated around the axis of the radiation source so that an opening is formed through which the radiation source can be removed in a direction perpendicular to its longitudinal direction and a new radiation source can be installed.

A drawback of the known illumination system is that the reflector is in direct contact with the radiation source so as to keep the radiation source in position, which results in a limitation of the temperature of the radiation source and has a detrimental influence on the lamp properties. Moreover, self-absorption of the radiation source plays an important role due to the limited available free space around the radiation source in the lighthousing. Both drawbacks result in a considerable loss of brightness.

A further drawback in those cases where only the radiation source is replaced is the relative difficulty of optimally repositioning the radiation source with respect to the reflector and the waveguide. In fact, the brightness and homogeneity of the display device are considerably influenced by the position of the radiation source with respect to the waveguide and the reflector.

OBJECTS AND SUMMARY OF THE INVENTION

It is an object of the invention to provide a display device whose radiation source can be replaced independently of the lighthousing and the illumination system in a relatively simple and inexpensive manner, and in which the homogeneity and brightness are still optimal after replacement.

To this end the flat-panel display device according to the invention is characterized in that a first part of the lighthousing is an integral part of the support and a second part of said lighthousing is a detachable cover along which the radiation source can be removed, and in that the radiation source is situated in a position which is free from the reflector and at a distance d from the waveguide, said position being determined by cooperation between at least securing means arranged on the radiation source and recesses provided in the lighthousing.

Since the lighthousing is an integral part of the support which is a part of the illumination system and since a part of the lighthousing is detachable so as to exchange the radiation source, it is possible to exchange only the lamp instead of the complete illumination system or lighthousing, which considerably reduces the costs of maintenance.

By providing the radiation source with securing means which cooperate with recesses in the lighthousing, it is ensured that the radiation source is positioned sufficiently accurately at a distance d from the waveguide and free from the reflector. Due to this free position, the temperature of the radiation source is idealized and the self-absorption of the radiation source is reduced considerably, which contributes to the efficiency of the display device.

Since the position of the radiation source is fixed by the design of the securing means on the radiation source and recesses in the lighthousing, the new radiation source is automatically secured in the desired position.

The reflector may be obtained, for example by providing the inner side of the lighthousing with a reflecting layer, for example by means of vapour depositing a reflecting material. A preferred embodiment of the flat-panel display device according to the invention is, however, characterized in that the reflector is a foil, one end of which is secured on a surface of the waveguide at a waveguide end facing the lighthousing and in that, when the radiation source is arranged in the lighthousing and when the detachable cover is provided, the foil is bent into a shape whose radius of curvature is smaller than the radius of curvature l/r of the radiation source for at least a part of the reflector.

In this manner the reflector is shaped by combining the first part of the lighthousing which is formed on the support and the second, detachable part. By combining the part of the lighthousing formed on the support and the detachable part, the reflector secured to the end of the waveguide facing the lighthousing is automatically bent to its correct shape.

In known flat-panel display devices in which a foil is used as a reflector such as in, for example the display device known from European Patent Application EP 0 469 321, the foil is secured both to the surface remote from the display panel and to the surface facing the display panel the waveguide end facing the radiation source. The drawbacks thereof are that the radiation source alone is no longer exchangeable, because the foil is secured to the two surfaces of the waveguide.

A further embodiment of the flat-panel display device according to the invention is characterized in that the lighthousing has a radius R over at least a given trajectory, within which trajectory the reflector takes the same shape.

By suitable choice of the shape of the lighthousing, the reflector can more easily be given this shape for which the optimum position of the radiation source is determined.

A further embodiment of the flat-panel display device according to the invention is characterized in that the radius r of the radiation source, the distance l between the radiation source and the reflector and the distance d between the radiation source and the waveguide are defined by the following relations $$0 < l/t \leq 18$$

$$0 < d/(R-r) \leq 2$$

in which R is the inner radius of the lighthousing and t is the thickness of the waveguide.

The inner radius of the lighthousing is understood to mean the inner radius of the lighthousing provided with the reflector and reduced by the thickness of the reflector. The thickness of the reflector may generally be ignored.

d is the distance measured between the waveguide end face facing the radiation source and the outer wall of the radiation source along the projection of the centre of the radiation source on the plane of the end face of the waveguide. l is the distance measured between the outer wall of the radiation source and the plane which is in alignment with the surface of the waveguide on which the reflector is secured along the connection line between the centre of the radiation source and said plane perpendicular to this plane.

If d/(R−r) becomes too small, the radiation source shields the waveguide, which leads to a decrease in brightness. However, if d/(R−r) becomes too large, the homogeneity will increase but the brightness will decrease because the optical aperture will be smaller and because the space in the lighthousing around the radiation source decreases. For too large and too small l/t values the radiation source is no longer exactly situated at the location of the waveguide and there is a decrease in space between the radiation source and the inner side of the lighthousing, while the reflector is no longer optimally reflective at this geometry. In both cases the result is a reduction of brightness.

A preferred embodiment of the flat-panel display device according to the invention is characterized in that it holds for the position (l, d) of the radiation source that $$0.7 \leq l/t \leq 0.9$$

$$0.9 \leq d/(R-r) \leq 1.1$$

Optimization of the position (l, d) of the radiation source with respect to the reflector and the waveguide in accordance with the given relations results in a relatively high brightness and homogeneity of the display device.

From an optical point of view, it makes no difference for determining the optimum position of the radiation source whether the second end of the reflector foil is secured or not secured to the waveguide. A preformed reflector which is secured to two surfaces of the waveguide may also satisfy the relations mentioned in the previous embodiments. However, it is a drawback that the radiation source is not exchangeable in this case.

A further embodiment of the flat-panel display device according to the invention is characterized in that the securing means arranged on the radiation source are preformed lampholders made of a resilient synthetic material.

By providing the radiation source with preformed lampholders of a resilient synthetic material, the lampholders are positioned in the recesses by means of the detachable part of the lighthousing. Without any additional alignment, the radiation source will be accurately secured and optimally positioned whenever it is replaced. Moreover, no separate components are required to secure the radiation source and this simple construction allows a relatively rapid replacement of the radiation source, which reduces the costs of maintenance. Moreover, such lampholders serve at the same time as high-voltage insulations and as tensile contacts for the connection wires secured to the lamp.

A further embodiment of the flat-panel display device according to the invention is characterized in that the resilient synthetic material has a vibration-damping effect.

Since the synthetic material also has a vibration-damping effect, a vibrationless connection of the radiation source is realised. Consequently, the lampholders will absorb possible shocks and protect the lamp from breakage. Moreover, the radiation source will thus continuously remain in the same position with respect to the reflector and the waveguide so that a substantially constant brightness and homogeneity of the display device are ensured.

The flat-panel display device according to the invention is preferably characterized in that the reflector has a high degree of reflection and is specularly reflecting.

A reflector having a high degree of reflection is understood to be a reflector having a reflection coefficient of more than 90%.

Moreover, the brightness can be increased considerably by using a specular reflector instead of a diffuse reflector.

The invention also relates to an illumination system suitable for use in a flat-panel display device according to the invention.

A radiation source which is particularly suitable for use in the flat-panel display device and the illumination system according to the invention is characterized in that the radiation source is elongate and its ends are provided with preformed lampholders made of a resilient synthetic material, via which lampholders the radiation source is provided with connection wires.

The preformed lampholders of resilient synthetic material allow the radiation source to be accurately secured and optimally positioned without any alignment whenever it is to be replaced. Moreover, separate components for securing the radiation source are not necessary.

A preferred embodiment of the radiation source according to the invention is characterized in that the resilient synthetic material has a vibration-damping effect.

Since the synthetic material also has a vibration-damping effect, the radiation source can be secured without vibrations in a display device according to the invention. The lampholders will absorb possible shocks and protect the lamp from breakage. Moreover, such lampholders continuously ensure the same position with respect to the reflector and the waveguide.

A further embodiment of the radiation source according to the invention is characterized in that sleeves are formed on the lampholders at a side along which the connection wires project.

The lampholders serve at the same time as high-voltage insulations and as tensile contacts for the connection wires of the radiation source. The sleeves formed on the lampholders ensure that the lampholders are even better retained when they are secured in a display device according to the invention.

BRIEF DESCRIPTION OF THE DRAWING

These and other aspects of the invention will be apparent from and elucidated with reference to the embodiments described hereinafter.

In the drawings

DESCRIPTION OF THE PREFERRED EMBODIMENT

The user directly views the display panel of a flat-panel display device so that this device may also be referred to as a direct-vision device. For such a device it is desirable that the illumination system for illuminating the display panel has a small dimension transverse to the panel. This is, inter alia the case for direct-vision devices with peripheral or edge illumination. A waveguide, at least one end face of which is illuminated, is present under the transmission display panel which is being watched by the viewer. The opposite end face may be provided with a reflector. Radiation from the radiation source enters this waveguide along one or more end faces of the waveguide and leaves the waveguide at the surface facing the display panel.

Figure 1:
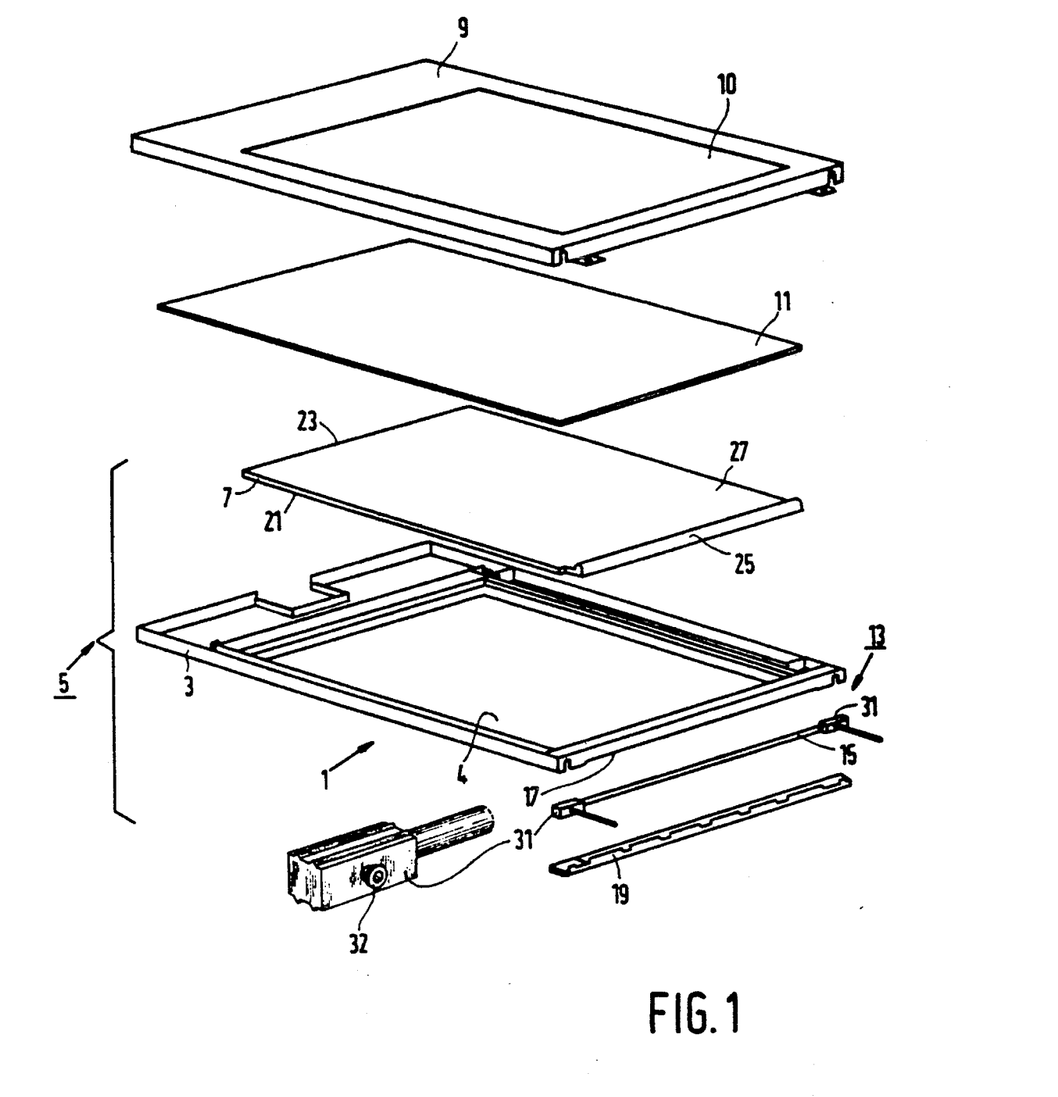
FIG. 1 is an exploded perspective elevational view of an embodiment of a flat-panel display device according to the invention.

FIG. 1 is an exploded perspective elevational view of a flat-panel display device 1. The display device 1 comprises a support 3 of, for example a synthetic material such as polycarbonate and may be made by means of, for example injection moulding. For practical reasons such as, for example manufacture and weight of the support, the support 3 may have a window 4. The support 3 comprises, in succession, a waveguide 7 and a transmission display panel 11.

Figure 2A:
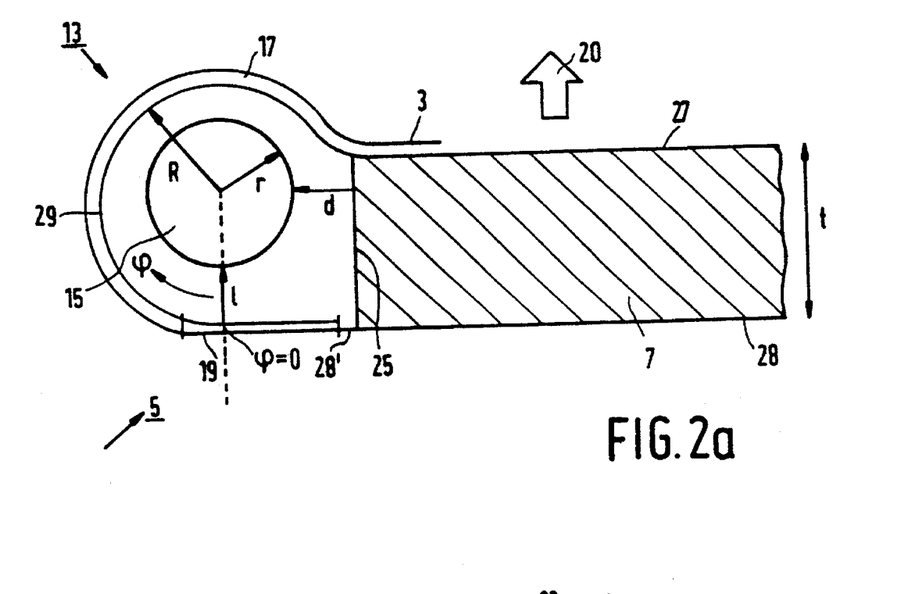
FIGS. 2a and 2b are diagrammatic cross-sections of possible embodiments of a part of an illumination system for the flat-panel display device according to the invention.

The display device 1 provided with peripheral illumination further comprises a lighthousing 13 accommodating a radiation source 15. The radiation source 15 may be, for example a cold cathode fluorescent lamp. The support 3, the waveguide 7 and the lighthousing 13 with the radiation source 15 jointly constitute the illumination system 5. The lighthousing 13 consists of two parts 17, 19. The first part 17 is an integral part of the support. It can, for example, directly be formed on the support 3 by injection moulding. The second part 19 is formed as a detachable cover. After removal of the cover 19, the radiation source 15 may be replaced by removing the lamp 15 from the lighthousing 13 in a direction perpendicular to its longitudinal direction. The detachable cover 19 is situated, for example at the side of the support 3 remote from the display panel 11, as is shown in FIG. 2a. The cover 19 may also be situated in a different position with respect to the display panel.

The assembly is held together by means of a frame 9 which cooperates with the support 3. The frame 9 has a window 10 along which the display panel 11 is visible and along which the user can view the image formed by the display panel. The frame 9 may be made of, for example a metallic material or an aluminium alloy or a synthetic material.

The display panel 11 is, for example a liquid crystal display panel, further referred to as LCD panel. Such a panel comprises a layer of liquid crystalline material, for example of the nematic type, which is enclosed between two transparent plates. The display panel may be either an active or a passive-drive display panel. Both types of direct-drive display panels are described in, for example European Patent Application EP-A 0 266 184.

A possible embodiment of the waveguide 7 will now be described. The waveguide 7 consists of a transparent plate which has a pattern of dots (not shown) of diffusely reflecting material on the surface 21 remote from the display panel 11. The density and size of the dots increases as the distance to the radiation source 15 in the waveguide 7 increases. The end face 23 of the waveguide 7 opposite the radiation source 15 may have a reflecting layer, for example an Ag film. Radiation from the radiation source 15 is coupled into the transparent plate via the end face 25. The radiation propagates in the direction of the end face 23 and, after having been scattered on the dot pattern, it leaves the transparent plate via the surface 27 of the waveguide 7 facing the display panel 11 so that the display panel 11 is illuminated. The waveguide 7 may be, for example a PMMA plate whose surface 28 remote from the display panel may have a pattern of diffusely high-reflecting ink or paint provided, for example by means of a silk-screening technique. Such a plate used as a waveguide is known per se, for example from U.S. Pat. No. 4,985,809.

Figure 2B:
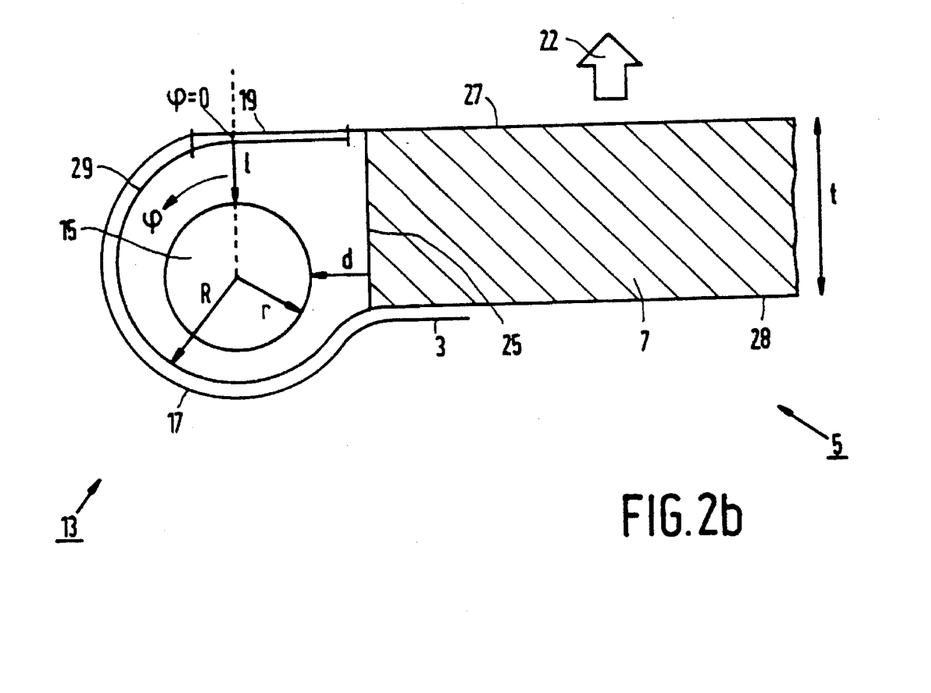

Since the radiation source 15 emits light into all directions, only a given quantity of this light will reach the waveguide 7 if no further measures are taken. To increase the brightness of the display device 1, the inner side of the lighthousing 13 is provided with a reflector 29. FIGS. 2a and 2b show diagrammatically in detail two embodiments of a part of the illumination system 5 in a cross-section. The direction in which the light leaves the waveguide 7 is denoted by the arrow 20 in FIG. 2a and by the arrow 22 in FIG. 2b. In principle, the reflector 29 may be a diffuse reflector. However, to obtain an optimal brightness, the reflector 29 is preferably specular. The reflector 29 may comprise a high-reflecting layer which is vapour-deposited on the inner side of the lighthousing 13, but this method is relatively expensive and cumbersome. In the display device 1 according to the invention the reflector 29 is constituted by a specularly reflecting foil having a high degree of reflection. A foil, vapour deposited with silver, for example, is eminently suitable as a specularly reflecting foil having a high degree of reflection. In FIG. 2a the foil is secured on the surface 27 of the waveguide 7 facing the display panel 11 at the waveguide facing the lighthousing 13. FIG. 2b shows another embodiment of the illumination system 5 in which the high-reflecting foil is secured to the surface 28 remote from the display panel. The foil is given a suitable shape in an analogous manner in the two embodiments and will be further described.

When the waveguide 7 is positioned on the support 3, the foil 29 extends beyond the lighthousing 13. When subsequently the lamp 15 is pushed into the lighthousing 13, the foil 29 partly bends into the shape of the lighthousing 13. The part of the foil 29 then still projecting from the lighthousing 13 is bent further round the radiation source 15 by closing the lighthousing 13 by means of the detachable part 19 of the lighthousing 13.

The desired shape of the foil, notably a shape for which the radius of curvature is larger than the radius of curvature l/r of the radiation source, may be obtained in different manners. A first manner is to provide the inner side of the detachable cover with a rim over the longitudinal direction of the lighthousing so that the rim prevents the loose end of the foil from moving further into the direction of the waveguide when the cover is provided. Thus, the desired shape of the foil can be obtained, provided that the position of the rim and the length of the foil are relatively accurately adjusted to each other. However, it is relatively difficult to comply with this condition.

It is much simpler and less expensive to give the lighthousing at least partly the shape which the reflector is to take, as is proposed in the present invention. The lighthousing 13 is given a radius R over a given angular region α measured clockwise (FIG. 2a) from the point of intersection of the perpendicular from the centre of the radiation source with the plane 28' aligned with surface 28 of the waveguide 7 on which the foil 29 is secured. The radius R is the inner radius of the lighthousing 13, i.e. the radius of the lighthousing reduced by the thickness of the reflector. However, the thickness of the foil (for example, 0.05 mm) may generally be ignored. The shape taken by the foil 29 after such an assembly then complies with $R_r = R$ over a given trajectory, in which $R_r$ is the radius of the shape of the foil within this trajectory. In the embodiments shown in FIGS. 2a and 2b the trajectory extends through an angular region φ in which φ=270°. The angular region α is determined, inter alia by the thickness t of the waveguide 7.

The above-described method of mounting radiation source 15 and reflector 29 in the lighthousing 13 further results in a mutually well-defined position between radiation source 15, reflector 29 and waveguide 7. This position is given by l (lift) and d (distance). l is the distance between the radiation source 15 and the reflector 29, measured between the outer wall of the radiation source and the plane aligned with plane 28' which is aligned with the surface 28 of the waveguide 7 on which the foil is secured along the connection line between the centre of the radiation source and said plane perpendicular to this plane. d is the distance measured between the end face 25 of the waveguide 7 facing the radiation source 15 and the outer side of the radiation source 15 along the connection line between the centre of the radiation source 15 and the end face 25 of the waveguide 7 perpendicular to the waveguide 7. The position (l, d) determines the brightness and homogeneity of the display device to a considerable extent.

When d, the distance between the radiation source 15 and the waveguide 7, becomes too small, the radiation source 15 will shield the end face 25 along which the radiation enters the waveguide 7. Consequently, the brightness will decrease. However, if d becomes too large, the homogeneity will increase but less radiation will reach the end face 25 of the waveguide 7 so that the brightness will decrease again.

When l, the distance between the radiation source 15 and the reflector 29, becomes too small or too large, the reflector 29 will shield the radiation source 15. This is the case, for example in the afore-mentioned abstract, where the reflector is used to keep the radiation source in position (l≈0). Moreover, at too large l values, a too large part of the radiation source 15 will no longer be in front of the waveguide 7. Consequently, there will be a decrease of direct radiation, and hence a decrease of brightness.

It has been found from the foregoing and from computations that a display device having a relatively high brightness and homogeneity is obtained if the distance d between the radiation source 15 and the waveguide 7 and the distance l between the radiation source 15 and the reflector 29 in the illumination system are defined by the following relations:

$0 < l/t \leq 18$ $0 < d/(R-r) \leq 2$

Where, t is the thickness of the waveguide 7, r is the radius of the radiation source 15 and R is the inner radius of the lighthousing 13.

The present invention is based, inter alia on the recognition that the brightness and homogeneity of a flat-panel display device are considerably influenced by the position of the radiation source with respect to the reflector (l) and the waveguide (d). It is therefore proposed to optimize the distances l and d in such a way that an efficient display device having a relatively high brightness and homogeneity is obtained. FIGS. 3a, 3b, 3c and 3d show some graphs illustrating this optimization.

Figure 3A:
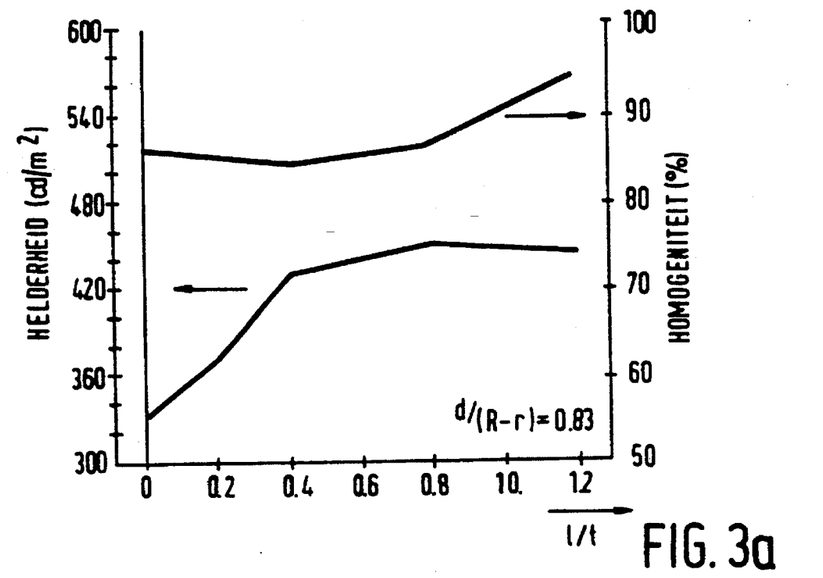
FIGS. 3a, 3b, 3c and 3d show examples of graphs for an illumination system according to FIG. 2a, from which graphs the optimum position (l, d) of the radiation source can be determined in dependence upon various parameters.

In FIG. 3a, the ratio of the distance d between the radiation source 15 and the waveguide 7 to the difference between the inner radius R of the lighthousing 13 and the radius r of the radiation source 15 is maintained constant at 0.83, while l/t, with t being the thickness of the waveguide 7, varies. As l/t increases, the brightness, expressed in cd/m², increases to a maximum at a value l/t−0.8 and subsequently decreases again. The homogeneity increases with an increasing l/t value. A larger l/t value implies either a thinner waveguide or the radiation source is further remote from the reflector.

Figure 3B:
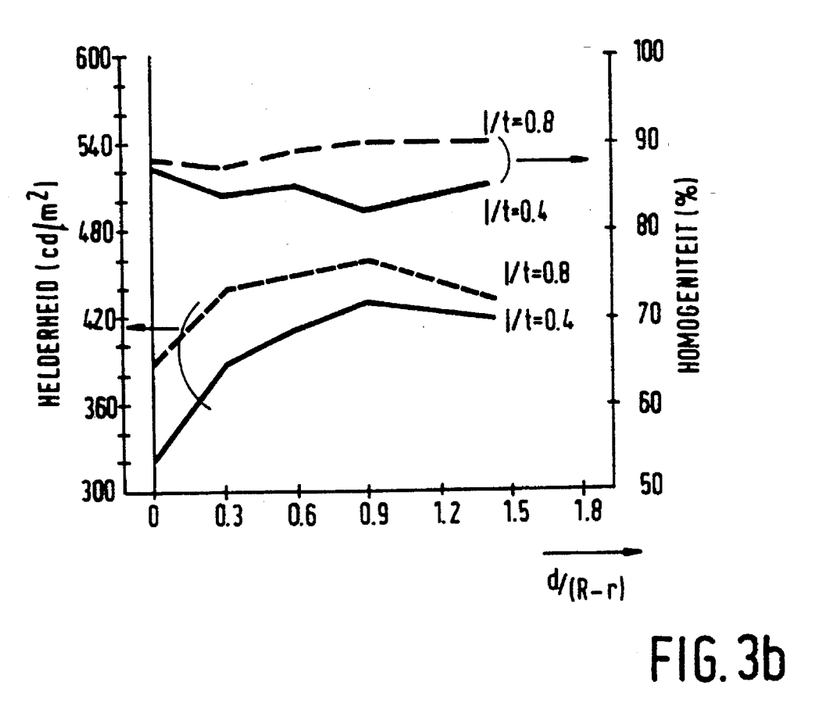

In FIG. 3b, d/(R−r) is varied for two constant l/t values. At the larger l/t value of 0.8, a variation of the d/(R−r) value hardly influences the homogeneity of the display device, while at the lower l/t value of 0.4, i.e. when the radiation source is closer to the reflector or when there is a thicker waveguide, the homogeneity is influenced to a greater extent by a variation of the d/(R−r) value. Both for l/t=0.4 and for l/t=0.8, the brightness increases to a maxium at d/(R−r)=0.9 and subsequently decreases again because the radiation source is then too far away from the waveguide or is too close to the reflector.

Figure 3C:
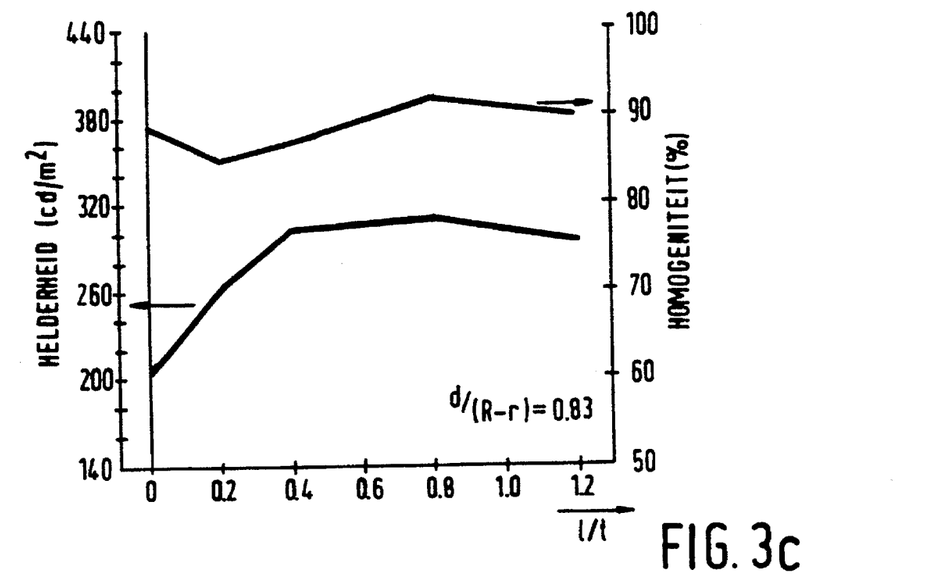
Figure 3D:
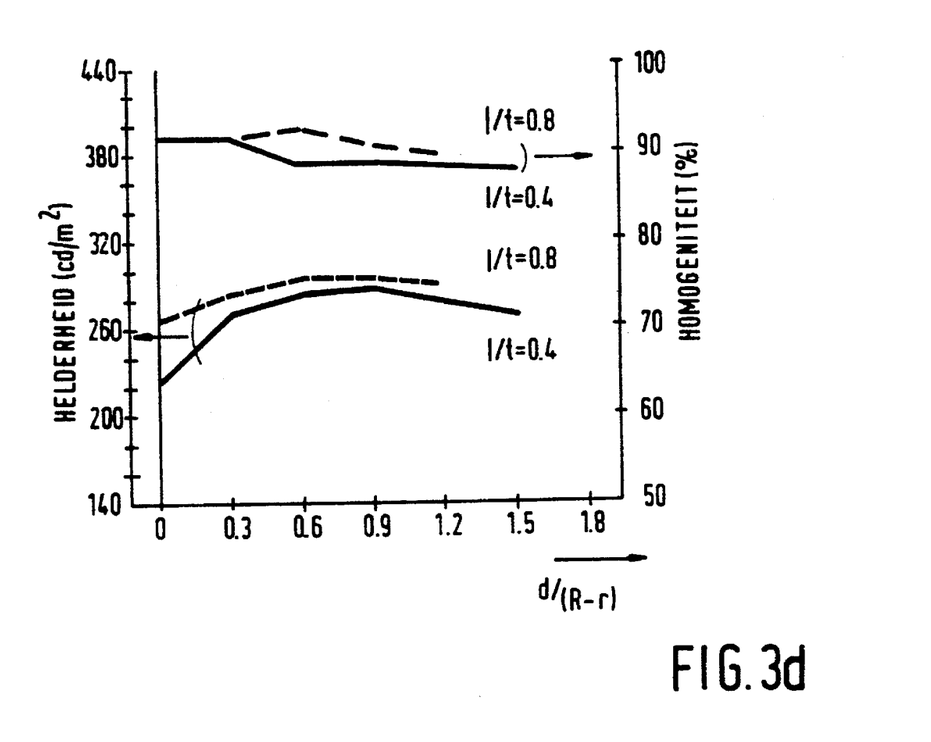

FIGS. 3a and 3b apply to an illumination system with a specular reflector. FIGS. 3c and 3d illustrate, for the same constant d/(R−r) and l/t values, the difference with a lighthousing provided with a diffuse reflector instead of a specular reflector. The comparison of FIGS. 3a, 3b with FIGS. 3c, 3d shows that variation of the d/(R−r) and l/t values has substantially the same effect on the variation of brightness and homogeneity. Moreover, the variation of homogeneity is hardly influenced by the choice of a diffuse or a specular reflector. The absolute brightness is, however, influenced considerably. As is apparent from the comparison of FIG. 3a with FIG. 3c and FIG. 3b with FIG. 3d, a diffuse reflector produces a considerably lower brightness than a specular reflector.

The graphs also show that the homogeneity and brightness of the display device can be optimized by ensuring that $0.7 \leq l/t \leq 0.9$ and $0.9 \leq d/(R-r) \leq 1.1$ in the illumination system 5, where, t is the thickness of the waveguide 7, r is the radius of the radiation source 15, R is the inner radius of the lighthousing 13 and (l,d) defines the position (l,d) of the radiation source 15. This optimization occurs in the embodiment of the illumination system shown in FIG. 2a. Typical values of the parameters used are: t=2 to 3 mm, 2R=5.5 mm and 2r=3 mm.

At the above-mentioned optimization of the position of the radiation source, it makes no difference optically whether the second end of the reflector foil is secured or not secured to a surface of the waveguide. The above-mentioned relations also apply in the case of a preformed reflector secured to two surfaces of the waveguide. However, a drawback then is that the radiation source cannot be replaced.

To ensure that a new radiation source is placed in the same predetermined optimum position in the lighthousing 13 as the radiation source to be replaced, the radiation source 15 is provided with preformed lampholders 31 (FIG. 1) and the lighthousing 13 is provided with recesses (not shown) in the part 17 formed on the support 3. The recesses may have a simple rectangular cross-section in a plane perpendicular to the longitudinal direction of the radiation source 15. When the radiation source 15 is arranged in the lighthousing 13, the radiation source will automatically come into the predetermined optimal position due to cooperation between the lampholders and the recesses in the lighthousing.

The lampholders 31 are preferably made of a resilient synthetic material and have the same rectangular cross-section as the recesses. However, this cross-section preferably has a slightly smaller dimension in the direction perpendicular to the plane of the detachable part 19 of the lighthousing 13 than the cross-section of the recesses. The surfaces of the lampholders, parallel to this plane, are provided with some thin ribs extending parallel to the longitudinal direction of the lamp. When the radiation source 15 is placed in the first part 17 of the lighthousing 13 and when the detachable cover 19 is provided, these ribs will be slightly depressed so that the lampholders are clamped in the recesses of the lighthousing.

In addition to its resilience, the lampholder material preferably has a vibration-damping effect. In this manner the lamp is shielded from breakage in the case of possible shocks. A further advantage of a vibrationless connection of the radiation source is that the optimum position of the radiation source, and consequently the optimum brightness and homogeneity of the display device, is continuously maintained. Very suitable materials for the lampholders 31 are, for example, silicones. The ends of the radiation source 15 are provided with connection wires and the lampholders may be, for example insulators formed by moulding. The lampholders 31 then serve at the same time as high-voltage insulations and as tensile contacts for these connection wires. Moreover, a sleeve 32 may be formed on the lampholders 31 at the side where the connection wires extend. In cooperation with recesses provided in the support 3, this sleeve 32 will ensure that the lampholders 31 are even better secured.

Figure 4A:
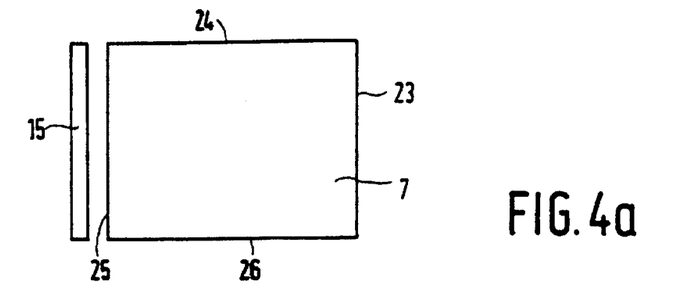
FIGS. 4a, 4b, 4c and 4d show diagrammatically some embodiments of radiation sources suitable for use in an illumination system according to the invention.

The above-described embodiment of an illumination system for the display device according to the invention uses only one, straight fluorescent lamp 15 at one of the end faces 23 or 25 of the waveguide 7, as is shown in FIG. 4a.

Figure 4B:
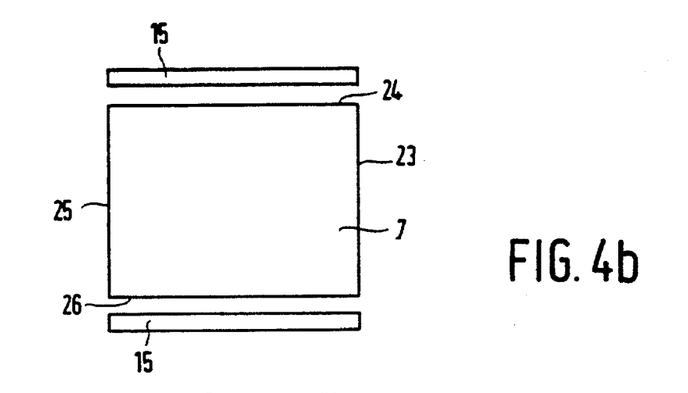

A second possibility is shown in FIG. 4b in which a single, straight fluorescent lamp 15 is arranged at each of two opposite end faces 23 and 25 or 24 and 26 of the waveguide 7. In that case two lighthousings must be formed on the support 3, which lighthousings have recesses cooperating with the lampholders for positioning the lamps. The advantage of this embodiment is an increase of the maxium achievable brightness.

A third possibility is the use of a bent lamp 16 which surrounds the waveguide 7 at three or all four end faces and in which the lighthousing 13 extends in the support 3 also over the distance covered by the radiation source. These two embodiments are shown in FIGS. 4c and 4d.

Figure 4C:
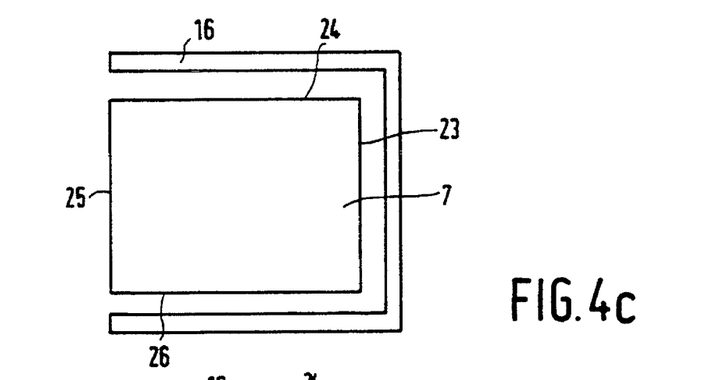
Figure 4D:
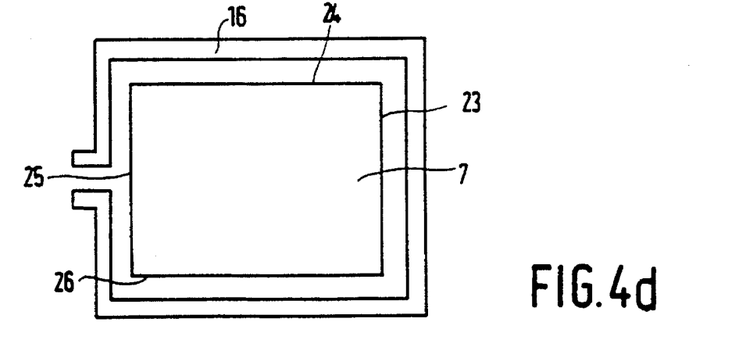

The additional advantage which is obtained with the embodiments shown in FIGS. 4c and 4d is an increased efficiency of the display device. In fact, electrode losses limit the efficiency of relatively short lamps to a considerable extent. By making use of a longer lamp, these losses can be reduced and the efficiency can be improved.

We claim:

1. A flat-panel display device comprising an illumination system and a transmission display panel, the illumination system comprising a support, a plate-shaped waveguide and at least one lighthousing accommodating a tubular radiation source having a radius r for illuminating at least one end face of the waveguide, and a reflector for reflecting radiation emitted by the radiation source towards the waveguide, characterized in that the lighthousing comprises a first part which is an integral part of the support and a second part which is a detachable cover along which the radiation source can be removed, and further characterized in that means are provided for securing the radiation source in a position which is spaced apart from the reflector and at a distance d from the waveguide, and further characterized in that recesses are provided in the lighthousing, and further characterized in that said position is determined by cooperation between at least the securing means and the recesses.

2. A flat-panel display device as claimed in claim 1, characterized in that the reflector is a foil, one end of which is secured on a surface of the waveguide at a waveguide end face, and further characterized in that, when the radiation source is arranged in the lighthousing and when the detachable cover is provided, the foil is bent into a shape whose radius of curvature is smaller than the radius of curvature l/r of the radiation source for at least a part of the reflector.

3. A flat-panel display device as claimed in claim 1, characterized in that the lighthousing has a radius R over at least a given trajectory, within which trajectory the reflector takes the same shape.

4. A flat-panel display device as claimed in claim 3, characterized in that the radius r of the radiation source, the distance l between the radiation source and the reflector and the distance d between the radiation source and the waveguide are defined by the following relations:

$$0 < l/t \leq 18$$

$$0 < d/(R-r) \leq 2$$

in which R is the inner radius of the lighthousing and t is the thickness of the waveguide.

5. A flat-panel display device as claimed in claim 4, characterized in that that the position (l,d) of the radiation source is defined by:

$$0.7 \leq l/t \leq 0.9$$

$$0.9 \leq d/(R-r) \leq 1.1.$$

6. A flat-panel display device as claimed in claim 1, characterized in that the securing means comprises preformed lampholders made of a resilient synthetic material.

7. A flat-panel display device as claimed in claim 6, characterized in that the resilient synthetic material has a vibration-damping effect.

8. A flat-panel display device as claimed in claim 1, characterized in that the reflector is specularly reflecting.

9. An illumination system suitable for use in a flat-panel display device as claimed in claim 1.

10. A radiation source suitable for use in a flat-panel display device as claimed in claim 1, characterized in that the radiation source is elongate, further characterized in that preformed lampholders made of a resilient synthetic material are provided at the ends of the radiation source, and further characterized in that connection wires are provided for the radiation source, which connection wires pass through the lampholders.

11. A radiation source as claimed in claim 10, characterized in that the resilient synthetic material has a vibration-damping effect.

12. A radiation source as claimed in claim 10, characterized in that sleeves are provided on the lampholders at a side along which the connection wires extend.

13. A flat-panel display device as claimed in claim 2, characterized in that the lighthousing has a radius R over at least a given trajectory, within which trajectory the reflector takes the same shape.

14. A flat-panel display device as claimed in claim 2, characterized in that the securing means comprises preformed lampholders made of a resilient synthetic material.

15. A flat-panel display device as claimed in claim 3, characterized in that the securing means comprises preformed lampholders made of a resilient synthetic material.

16. A flat-panel display device as claimed in claim 4, characterized in that the securing means comprises preformed lampholders made of a resilient synthetic material.

17. A flat-panel display device as claimed in claim 5, characterized in that the securing means comprises preformed lampholders made of a resilient synthetic material.

18. A radiation source as claimed in claim 11, characterized in that sleeves are provided on the lampholders at a side along which the connection wires extend.

* * * * *